United States Patent
Walser

(10) Patent No.: US 12,399,517 B2
(45) Date of Patent: *Aug. 26, 2025

(54) SINGLE ZONE VARIABLE AIR VOLUME CONTROL SYSTEMS AND METHODS

(71) Applicant: JOHNSON CONTROLS LIGHT COMMERCIAL IP GMBH, Neuhausen am Rheinfall (CH)

(72) Inventor: Jay C. Walser, Norman, OK (US)

(73) Assignee: JOHNSON CONTROLS LIGHT COMMERCIAL IP GMBH, Neuhausen am Rheinfall (CH)

( * ) Notice: Subject to any disclaimer, the term of this patent is extended or adjusted under 35 U.S.C. 154(b) by 345 days.

This patent is subject to a terminal disclaimer.

(21) Appl. No.: 17/894,923

(22) Filed: Aug. 24, 2022

(65) Prior Publication Data

US 2023/0063806 A1  Mar. 2, 2023

Related U.S. Application Data

(63) Continuation of application No. 16/014,735, filed on Jun. 21, 2018, now Pat. No. 11,429,122.

(Continued)

(51) Int. Cl.
  *G05D 23/19* (2006.01)
  *F24F 3/044* (2006.01)
  (Continued)

(52) U.S. Cl.
  CPC ....... *G05D 23/1927* (2013.01); *F24F 3/0442* (2013.01); *F24F 3/14* (2013.01);
  (Continued)

(58) Field of Classification Search
  CPC . G05D 23/1927; G05D 23/1923; F24F 11/77; F24F 11/74; F24F 11/86;
  (Continued)

(56) References Cited

U.S. PATENT DOCUMENTS

| 3,945,432 A | 3/1976 | Tamblyn |
| 4,291,542 A | 9/1981 | Sminge et al. |

(Continued)

FOREIGN PATENT DOCUMENTS

| CN | 102338443 A | * | 2/2012 |
| JP | S6358049 A | | 3/1988 |

(Continued)

OTHER PUBLICATIONS

Deng et al., Device for Preventing Evaporator or Automobile Air Conditioner . . . , Feb. 1, 2012, CN102338443A, Whole Document (Year: 2012).*

*Primary Examiner* — Larry L Furdge
(74) *Attorney, Agent, or Firm* — Fletcher Yoder, PC

(57) ABSTRACT

A control system for a climate management system configured to control climate characteristics of a building includes a memory device and a processor. The memory device includes instructions that, when executed by the processor, cause the processor to receive, via a sensor, data indicative of an evaporator coil temperature of the climate management system, and operate an air mover of the climate management system to control supply of conditioned air to the building based on the evaporator coil temperature.

19 Claims, 6 Drawing Sheets

Related U.S. Application Data

(60) Provisional application No. 62/686,473, filed on Jun. 18, 2018, provisional application No. 62/523,144, filed on Jun. 21, 2017.

(51) Int. Cl.
  *F24F 3/14* (2006.01)
  *F24F 11/49* (2018.01)
  *F24F 11/65* (2018.01)
  *F24F 11/74* (2018.01)
  *F24F 11/77* (2018.01)
  *F24F 11/86* (2018.01)
  *F24F 110/10* (2018.01)
  *F24F 110/20* (2018.01)
  *F24F 140/20* (2018.01)

(52) U.S. Cl.
  CPC .............. *F24F 11/49* (2018.01); *F24F 11/65* (2018.01); *F24F 11/74* (2018.01); *F24F 11/77* (2018.01); *F24F 11/86* (2018.01); *G05D 23/1923* (2013.01); *F24F 2110/10* (2018.01); *F24F 2110/20* (2018.01); *F24F 2140/20* (2018.01); *F24F 2203/02* (2013.01); *F25B 2700/2104* (2013.01); *F25B 2700/2117* (2013.01)

(58) Field of Classification Search
  CPC .......... F24F 11/49; F24F 11/65; F24F 3/0442; F24F 3/14; F24F 2110/20; F24F 2110/10; F24F 2140/20; F24F 2203/02; F25B 2700/2104; F25B 2700/2117
  See application file for complete search history.

(56) References Cited

U.S. PATENT DOCUMENTS

| | | |
|---|---|---|
| 5,065,593 A * | 11/1991 | Dudley ................ F25D 21/006 |
| | | 62/227 |
| 6,938,433 B2 | 9/2005 | Bash et al. |
| 7,784,291 B2 | 8/2010 | Butler et al. |
| 8,145,363 B2 | 3/2012 | Bean, Jr. et al. |
| 8,538,585 B2 | 9/2013 | Thøgersen et al. |
| 9,400,119 B2 | 7/2016 | Malloy |
| 9,453,656 B2 | 9/2016 | Liu |
| 9,574,810 B1 | 2/2017 | West |
| 9,671,125 B2 | 6/2017 | Mowris et al. |
| 9,690,307 B2 | 6/2017 | Kates |
| 2004/0231832 A1 | 11/2004 | Schlecht et al. |
| 2005/0091997 A1 * | 5/2005 | Lee ...................... F25B 49/022 |
| | | 62/175 |
| 2006/0037332 A1 | 2/2006 | Hwang et al. |
| 2007/0227168 A1 | 10/2007 | Simmons |
| 2012/0221150 A1 * | 8/2012 | Arensmeier ....... G05B 23/0221 |
| | | 702/183 |
| 2013/0220589 A1 | 8/2013 | Liu |
| 2013/0261809 A1 | 10/2013 | Morrow et al. |
| 2014/0257575 A1 | 9/2014 | Roy |
| 2015/0191305 A1 * | 7/2015 | Ueno ...................... F25B 49/02 |
| | | 62/457.1 |
| 2016/0245569 A1 | 8/2016 | Unezaki et al. |
| 2019/0322158 A1 * | 10/2019 | Chevers ............... B60H 1/3208 |

FOREIGN PATENT DOCUMENTS

| | | |
|---|---|---|
| JP | H10197028 A | 7/1998 |
| JP | H10339500 A | 12/1998 |

* cited by examiner

SINGLE ZONE VARIABLE AIR VOLUME CONTROL SYSTEMS AND METHODS

CROSS-REFERENCE TO RELATED APPLICATIONS

This is a continuation application of U.S. Non-Provisional application Ser. No. 16/014,735, entitled "SINGLE ZONE VARIABLE AIR VOLUME CONTROL SYSTEMS AND METHODS," filed Jun. 21, 2018, which claims priority to and the benefit of U.S. Provisional Application No. 62/523,144, entitled "SINGLE ZONE VARIABLE AIR VOLUME (VAV) ALGORITHM," filed Jun. 21, 2017, and U.S. Provisional Application No. 62/686,473, entitled "SINGLE ZONE VARIABLE AIR VOLUME CONTROL SYSTEMS AND METHODS," filed Jun. 18, 2018, each of which is hereby incorporated by reference in its entirety for all purposes.

BACKGROUND

The present disclosure relates generally to heating, ventilation, and air conditioning systems. A wide range of applications exist for heating, ventilation, and air conditioning (HVAC) systems. For example, residential, light commercial, commercial, and industrial systems are used to control temperatures and air quality in residences and buildings. Such systems often are dedicated to either heating or cooling, although systems are common that perform both heating and cooling functions. Very generally, these systems operate by implementing a thermal cycle in which fluids are heated and cooled to condition a controlled space, typically the inside of a residence or building, to a desired temperature. Similar systems are used for vehicle heating and cooling, and as well as for general refrigeration. In some HVAC systems, such as single zone variable air volume (VAV) systems, compression and airflow may be adjusted to condition an area, or zone, of a building.

SUMMARY

The present disclosure relates to a climate management system having a control system configured to control climate characteristics of a building. The control system further includes a memory device and a processor. The memory device includes instructions that, when executed by the processor, cause the processor to receive, via a sensor, data indicative of an evaporator coil temperature of the climate management system, and operate an air mover of the climate management system to control supply of conditioned air to the building based on the evaporator coil temperature.

The present disclosure also relates to a climate management system having a control system configured to control climate characteristics of a building. The control system includes a memory device and a processor. The memory device includes instructions that, when executed by the processor, cause the processor to receive, via a first sensor, data indicative of an evaporator coil temperature of the climate management system, and receive, via a second sensor, data indicative of a supply air temperature of the climate management system. The memory device further includes instructions that, when executed by the processor, cause the processor to, in a first mode of operation of the climate management system, operate the air mover to supply conditioned air to the building based on the evaporator coil temperature relative to an evaporator coil set-point temperature, and in a second mode of operation of the climate management system, operate the air mover to supply the conditioned air to the building based on the evaporator coil temperature and based on the supply air temperature relative to a supply air set-point temperature.

The present disclosure further relates to a climate management system having an evaporator coil, a blower configured to move air across the evaporator coil, a compressor system configured to operate in multiple compression stages, a first sensor configured detect an evaporator coil temperature of the evaporator coil, a second sensor configured to detect a supply air temperature of the air downstream of the evaporator coil, and a controller. The controller is configured to control an operational fan speed of the blower based on the evaporator coil temperature in a first mode of operation and based on the supply air temperature in a second mode of operation.

DRAWINGS

Figure 5:
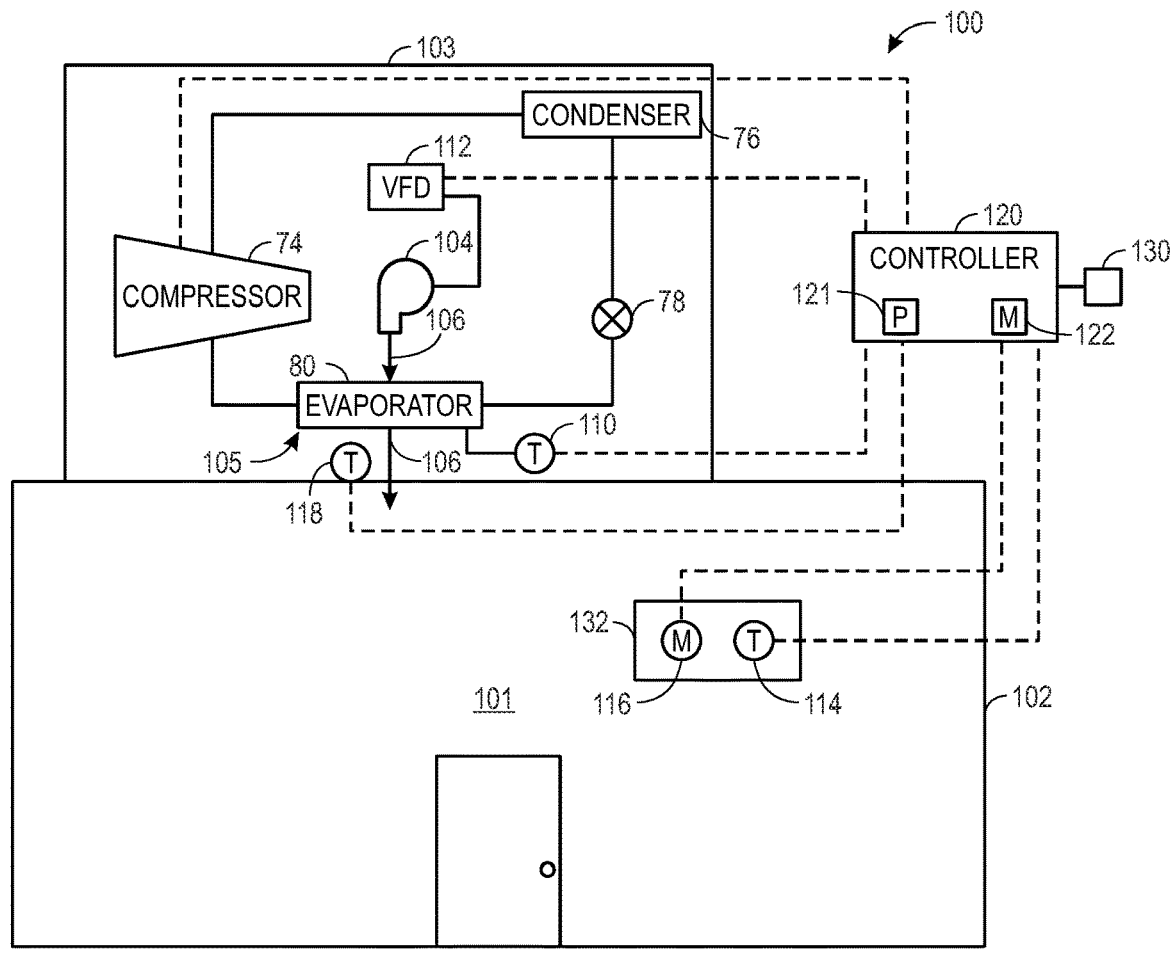
FIG. 5 is a schematic view of an embodiment of a climate management system used to condition a building, in accordance with aspects of the present disclosure.
Figure 7:
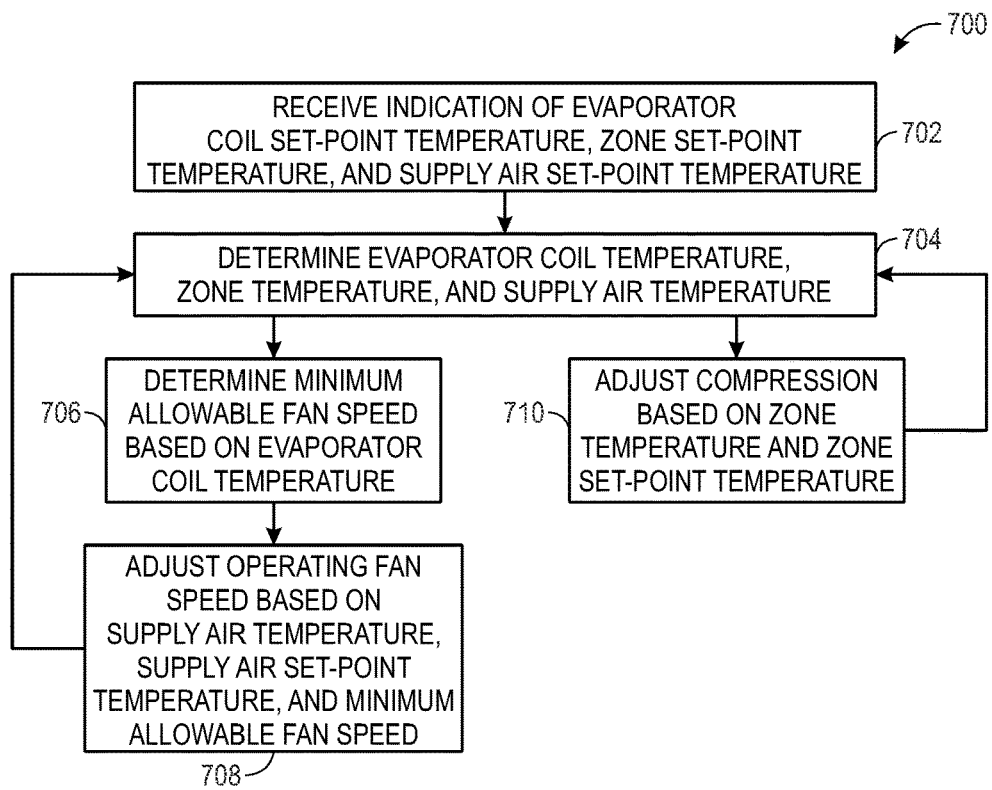
Figure 8:
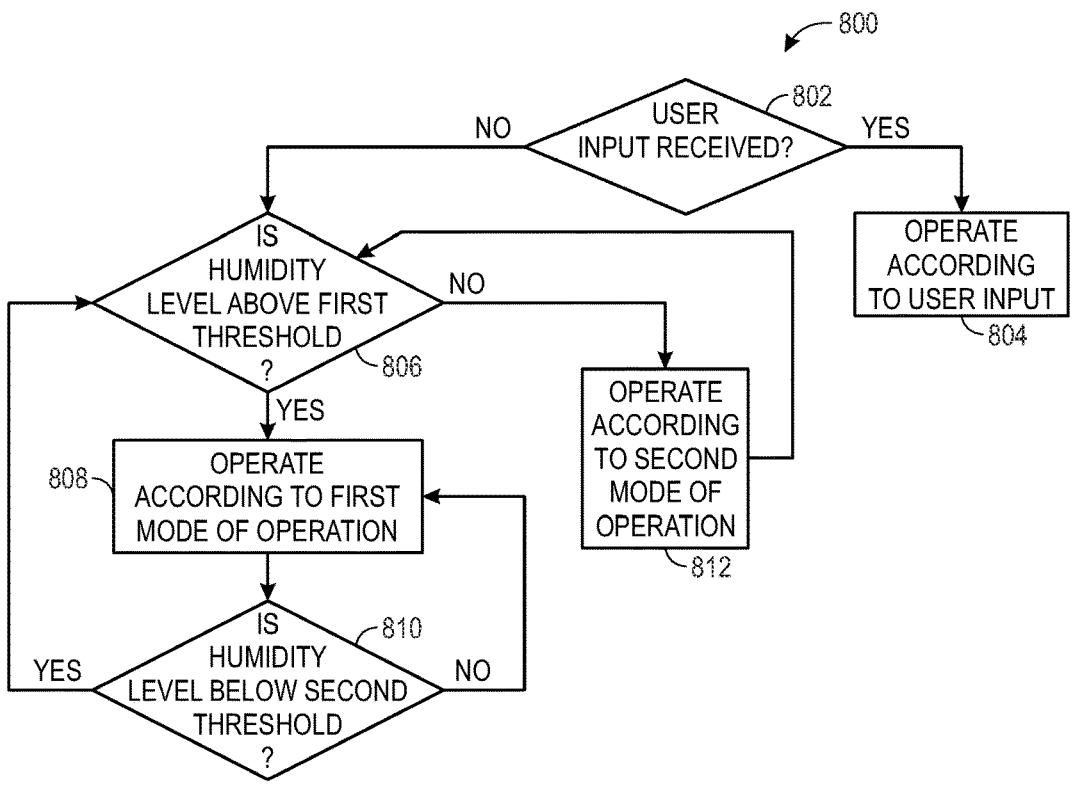

FIG. 7 is a flow chart of an embodiment of a second mode of operation of the climate management system of FIG. 5, in accordance with aspects of the present disclosure; and FIG. 8 is a flow chart of an embodiment of a process to switch between the first mode of operation and the second mode of operation of the climate management system of FIG. 5, in accordance with aspects of the present disclosure.

DETAILED DESCRIPTION

Certain heating, ventilation, and air conditioning (HVAC) systems, such as single zone variable air volume (VAV) systems, may operate inefficiently due to discrete control of compressor staging and/or fan speed. In such HVAC systems, an air handler may vary a flow rate of conditioned air, or a fan speed, based on a temperature of the conditioned space, or zone temperature, and may vary compressor staging, or a number of compressors in operation, on a supply air temperature. However, the supply air temperature may fluctuate based on changing conditions. Indeed, the supply air temperature may be affected by a return air temperature, an outside air temperature, and/or a cooling capacity of the evaporator coil, which may be inconsistent and irregular. The fluctuating supply air temperature may cause an increase in the number of compressor "starts" during compressor staging operations, thereby resulting in increased degradation of components of the HVAC system and increased energy usage. As used herein, a compressor "start"

refers to the energization of a non-operating compressor during a compressor staging operation or sequence.

Accordingly, the present disclosure is directed to a heating and cooling system in which compressor staging is based on a temperature of a space conditioned by the heating and cooling system, such as a zone of a building. Particularly, the temperature of a conditioned space or zone may have a high thermal inertia, thereby resulting in slower, or fewer, changes or fluctuations in the zone temperature as compared to the changes or fluctuations in supply air temperature. Controlling compressor staging based on the temperature of the zone instead of supply air temperature may result in fewer compressor starts. Moreover, in certain embodiments, fan speed, such as indoor fan speed, of the HVAC system may be based at least in part on a temperature of the evaporator coil of the HVAC system. In this manner, air flow over the evaporator coil may block, reduce, or prevent freezing of liquid on the evaporator coil and may exchange heat with refrigerant flowing through the evaporator coil to cool the air flow, thereby increasing an efficiency of the heating and cooling system.

Figure 1:
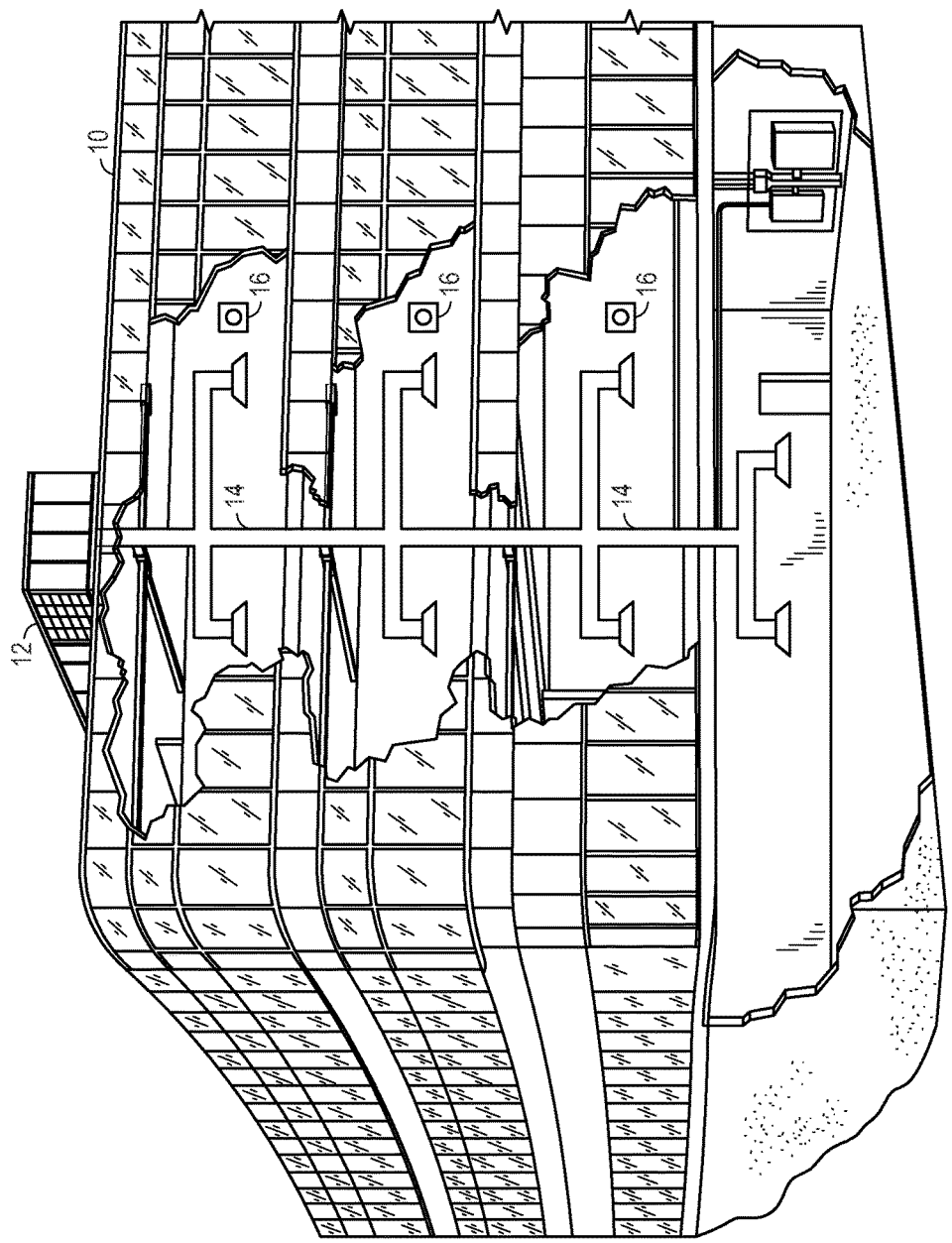
FIG. 1 is a perspective view of an embodiment of a heating, ventilation, and air conditioning (HVAC) system for building environmental management that may employ one or more HVAC units, in accordance with aspects of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
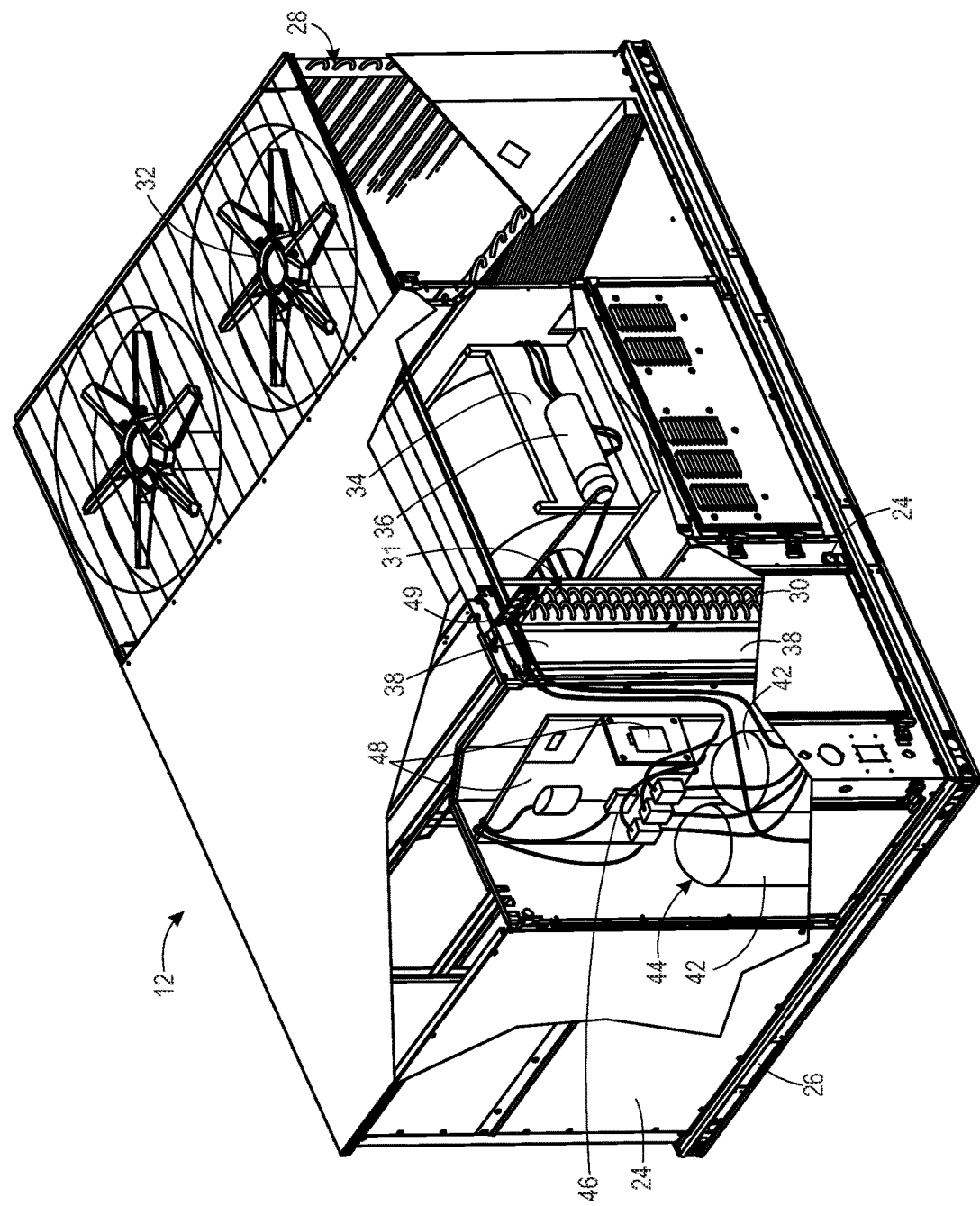
FIG. 2 is a perspective view of an embodiment of an HVAC unit of the HVAC system of FIG. 1, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
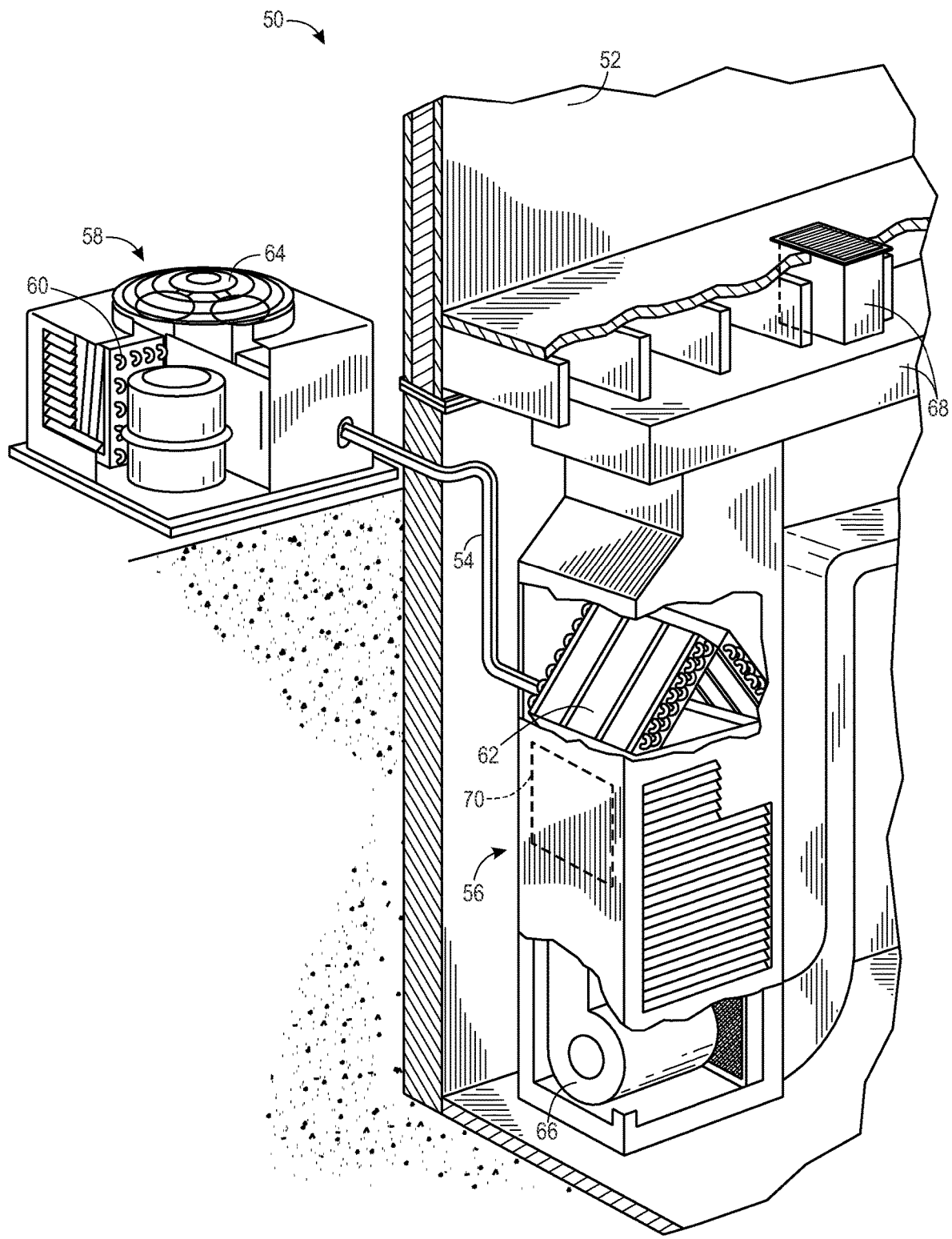
FIG. 3 is a perspective view of an embodiment of a residential split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set-point on the thermostat, or the set-point plus a small amount, the residential heating and cooling system 50 may become operative to refrigerate additional air for circulation through the residence 52. When the temperature reaches the set-point, or the set-point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
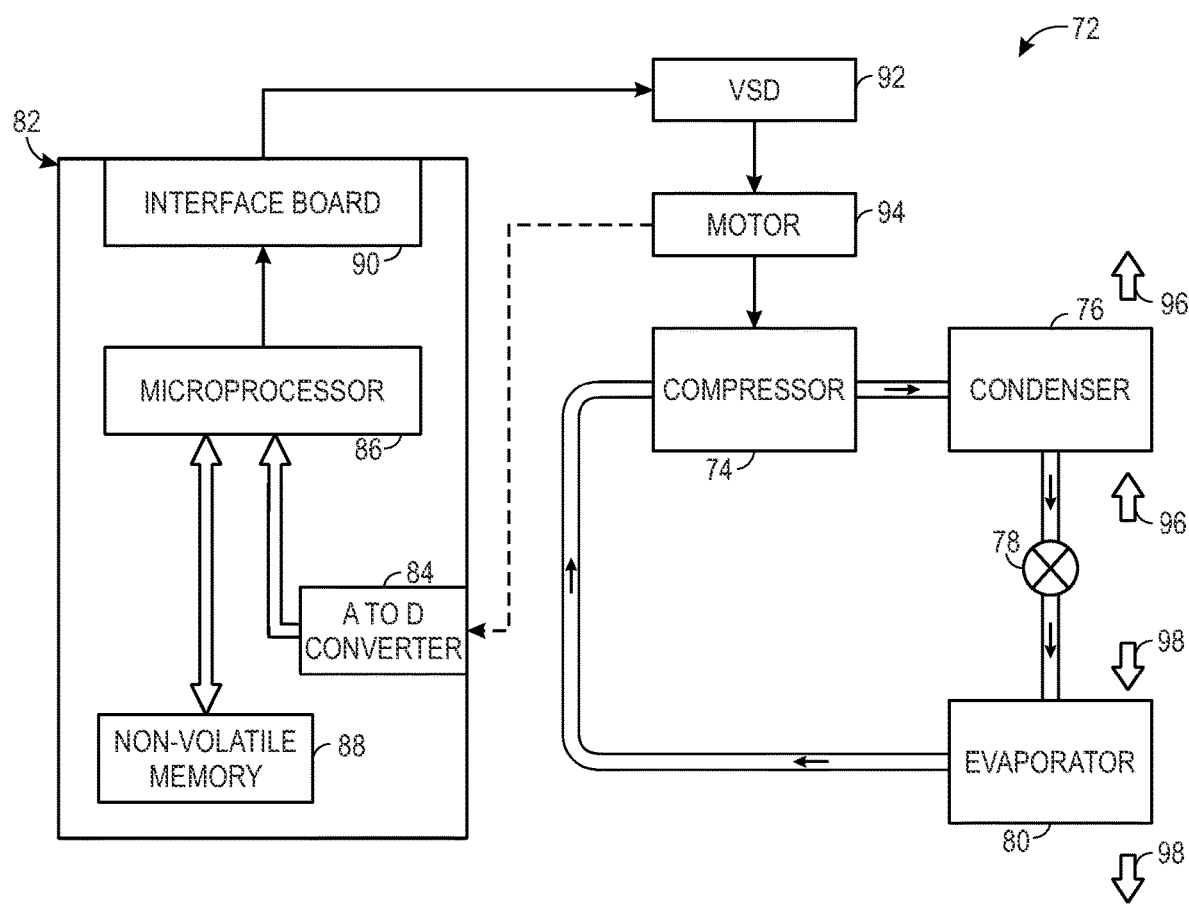
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, a climate management system 100, such as the HVAC unit 12, the climate management system 50, and/or the vapor compression system 72, may supply conditioned air to a conditioned space 101, or zone, of a building 102 with a blower 104, or a fan, that supplies conditioned air to the building 102 by forcing the air over an evaporator coil 105 of the evaporator 80, as shown by arrows 106. Particularly, the blower 104 is configured to push, pull, or other wise move air over the evaporator coil 105 at an air flow rate that is based at least in part on a temperature of the evaporator coil 105. In certain embodiments, the climate management system 100 may be a single zone variable air volume (VAV) system that is configured to adjust the air flow rate based conditions of the conditioned space 101. In certain embodiments, compressor operation and/or compressor staging may also be controlled based on conditions of the conditioned space 101. Indeed, refrigerant compression and supply air flow rate of the climate management system 100 may be adjusted to efficiently provide heated, cooled, and/or dehumidified air to the conditioned space 101.

To illustrate, FIG. 5 is a schematic of an embodiment of the climate management system 100, which is configured to supply conditioned air, such as heated, cooled, and/or dehumidified air, to the building 102, via an air handler 103, which may be a packaged rooftop unit. Particularly, the climate management system 100 may include the blower 104 that is configured to pull, push, or otherwise move air over the evaporator coil 105 to dehumidify and/or reduce a temperature of the air before it is supplied to the conditioned space 101 within the building 102. Indeed, the blower 104 is configured to place the air in a heat exchange relationship with refrigerant flowing through the evaporator coil 105, such that the refrigerant within the evaporator coil 105 absorbs heat from the air, thereby dehumidifying and/or reducing a temperature of the air before it is supplied to the conditioned space 101. Further, it should be understood that the illustration of the climate management system 100 has been simplified to highlight certain aspects, as discussed herein. As such, it should be understood that the climate management system 100 may include additional elements that are not illustrated, which would fall within the scope of the present disclosure.

As discussed herein, the blower 104 may be a modulating blower, such as a modulating fan, that is configured to supply air at a variable air flow speed, or cubic feet per minute (CFM), based at least in part on a temperature of the evaporator coil 105. To this end, the climate management system 100 may include a temperature sensor 110 configured to detect and/or measure a temperature of the evaporator coil 105. Particularly, the temperature sensor 110 may be a thermistor that is insulated and is in contact with an external surface of the evaporator coil 105. The climate management system 100 may further include a variable frequency drive (VFD) 112 configured to drive operation of the blower 104 based at least on feedback from the temperature sensor 110. Particularly, the VFD 112 may be configured to supply between approximately 25 hertz (Hz) and 60 Hz to drive an output, or fan speed, of the blower 104 between approximately 25% and 100%, respectively, of a maximum potential output of the blower 104.

The condition of the air that is supplied to the conditioned space 101 may also depend at least in part on a number of compressors and/or a number of compressor stages in operation, which may be referred to herein as "compression." For example, in certain embodiments, the compressor 74 may include multiple compressors and/or multiple compressor stages and may be configured to provide multiple cooling stages via operation of different numbers of compressors or stages. Accordingly, as discussed herein, increasing compression may refer to increasing the number of compressors or compressor stages in operation and decreasing compression may refer to decreasing the number of compressors or compressor stages in operation of the compressor 74. Generally, the cooling capacity of the evaporator coil 105 may increase as the compressor staging increases. That is, as compression increases, the rate at which chilled refrigerant flows the evaporator coil 105 increases, thereby allowing the evaporator 80 to absorb more heat from the air as the air passes over the evaporator coil 105. As discussed herein, the compression of the climate management system 100 may depend on a temperature of the conditioned space 101 relative to a set-point temperature. In some embodiments, however, the compression of the climate management system 100 may depend on a supply air temperature.

To this end, the climate management system 100 may further include a temperature sensor 114 and a humidity sensor 116 disposed within the conditioned space 101 and configured to measure a temperature and a humidity level, respectively, of the conditioned space 101. Additionally, the climate management system 100 may include a temperature sensor 118 configured to measure a temperature of the supply air, as illustrated by the arrows 106, such as a supply air temperature (SAT).

The climate management system 100 may further include a controller 120 configured to control compression and fan speed of the climate management system 100 based on the algorithms and processes discussed herein. The controller 120 may include a processor 121, which may represent one or more processors, such as an application-specific processor. The controller 120 may also include a memory device 122 for storing instructions executable by the processor 121 to perform the methods and control actions described herein for the climate management system 100. The processor 121 may include one or more processing devices, and the memory 122 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 121 or by any general purpose or special purpose computer or other machine with a processor.

Particularly, as discussed below, the controller 120 may receive data from the sensors 110, 114, 116, 118 and control the air handler 103 based on the data to provide conditioned air to the conditioned space 101 according to certain modes of operation. For example, in a first mode of operation, the controller 120 may adjust fan speed of the blower 104 based on a temperature of the evaporator coil 105. The controller 120 may also adjust compression, via energizing and/or de-energizing one or more compressors 74 of the climate management system 100, based on a temperature of the conditioned space 101. As discussed below, the first mode of operation may enable increased humidity control in the conditioned space 101. In a second mode of operation, the controller 120 may adjust fan speed of the blower 104 based on a supply air temperature. Control of the fan speed of the blower 104 may also include a minimum allowable fan speed offset of the blower 104 based on a temperature of the evaporator coil 105. As discussed herein, the minimum allowable fan speed offset may be utilized to prevent, block, restrict, or otherwise inhibit freezing of liquid, such as condensate, on the evaporator coil 105. Also, in the second mode of operation, the controller 120 may regulate compression based on a zone temperature of the conditioned space 101 or based on a supply air temperature. Generally, in both, or in either, of the first and second modes of operation, the compression of the climate management system 100 may be based on the zone temperature of the conditioned space 101 to enable reduction of a number of compressor 74 starts. As noted above, the conditioned space 101 may have a high thermal inertia, thereby resulting in slower, or fewer, changes in the zone temperature of the conditioned space 101, thereby resulting in fewer compressor starts or compression adjustments.

As mentioned above, in the first mode of operation, the controller 120 may control the fan speed of the blower 104 based on the evaporator coil temperature of the evaporator coil 105 and may control compression based on the zone temperature of the conditioned space 101. For example, regarding the evaporator coil temperature, the fan speed may be adjusted to control the evaporator coil temperature according to an evaporator coil set-point temperature. In certain embodiments, the evaporator set-point temperature may be based on input received from a systems operator through an input device 130, which, for example, may be an input/output device, such as a computing device. In other embodiments, the evaporator set-point temperature may be based on a manufacturer setting. Generally, the controller 120 may utilize a control loop feedback mechanism, such as a proportional-integral-derivative (PID) controller, to adjust the fan speed according to the evaporator set-point temperature.

For example, if the evaporator coil temperature measured by sensor 110 drops below the evaporator set-point temperature, the controller 120 may send one or more signals to the VFD 112 to increase the fan speed and increase the rate of airflow across the evaporator coil 105, thereby increasing a temperature of the evaporator coil 105 and increasing the supply air temperature. More specifically, as the air speed across the evaporator coil 105 increases, more total air is moved over the evaporator coil 105 such the total amount of heat that the refrigerant flowing through the evaporator coil 105 absorbs from the air may increase by virtue of the greater volume of air moving over the evaporator coil 105. However, because the air is flowing over the evaporator coil 105 at a faster rate, air particles of the air flow may be in contact with the evaporator coil 105 for shorter periods of time. In this manner, the amount of heat absorbed by the evaporator coil 105 per unit volume of air decreases, which correspondingly results in an increase in the supply air temperature.

Further, if the evaporator coil temperature rises above the evaporator set-point temperature, the controller 120 may send one or more signals to the VFD 112 to decrease the fan speed of the blower 104, thereby decreasing a temperature of the evaporator coil 105 and decreasing the supply air temperature. To illustrate, as the air speed decreases, air is moved over the evaporator coil 105 at a slower rate, such that the total amount of heat that the refrigerant flowing through the evaporator coil 105 absorbs from the air decreases by virtue of the lesser volume of air moving over the evaporator coil 105. As a result, a temperature of the evaporator coil 105 decreases. However, because the air is flowing over the coil at a slower rate, air particles of the air flow may be in contact with the evaporator coil 105 for longer periods of time. In this manner, the amount of heat absorbed by the evaporator coil 105 per unit volume of air increases, which correspondingly results in a decrease in the supply air temperature.

As the fan speed, evaporator coil temperature, and supply air temperature decrease, the amount of humidity or moisture that is removed from the air correspondingly increases. Thus, the humidity level of the conditioned space may decrease as the fan speed decreases. Accordingly, the evaporator coil set-point temperature may be sufficiently low to decrease humidity in the conditioned space 101 and high enough to prevent or block freezing of moisture on the evaporator coil 105. For example, in certain embodiments, the evaporator coil set-point temperature may be approximately 42° F., approximately between 42° F. and 44° F., approximately between 40° F. and 42° F., or approximately between 40° F. and 44° F.

Moreover, in the first mode of operation, the compression of the climate management system 100 may be based on the zone temperature of the conditioned space 101. For example, as the zone temperature increases, the controller 120 may send one or more signals to the air handler 103 to increase compression, thereby driving chilled refrigerant at an increased rate through the evaporator coil 105. Indeed, the supply air temperature may decrease as the compression increases, thereby decreasing the zone temperature of the conditioned space 101. Correspondingly, as the zone temperature decreases, the controller 120 may send or more signals to the air handler 103 to decrease compression, thereby driving chilled refrigerant at a decreased rate through the evaporator coil 105. Indeed, the supply air temperature may increase as the compression decreases, thereby increasing a zone temperature of the conditioned space 101. As discussed herein, compression may be based on the zone temperature due to the high thermal inertia of the conditioned space 101. For example, in large areas, such as department stores, cafeterias, dance halls, and so forth, the zone temperature of the areas may be more resistant to change than smaller conditioned spaces or areas. Accordingly, as compression control is based on the zone temperature of the conditioned space, and due to the lower fluctuation in zone temperature, the compression may be varied less, thereby resulting in fewer compressor starts and correspondingly less wear on the climate management system 100.

Further, as mentioned above, in the second mode of operation, the controller may adjust the operating fan speed of the blower 104 based on a supply air temperature. Control of the blower 104 may also be made with reference to a minimum possible or allowable fan speed, such as a minimum allowable fan speed offset, a minimum air supply rate, or a minimum output percentage, which is based on a temperature of the evaporator coil 105. As an example, when the temperature of the evaporator coil 105 is above approximately 42° F., the blower 104 may operate with a normal range of fan speed, such as from 0% to 100%, or 25% to 100%, of the total blower output or maximum fan speed. In other words, zero minimum fan speed offset may be applied to the minimum possible fan speed of the blower 104 when the temperature of the evaporator coil 105 is above approximately 42° F. The fan speed of the blower 104 may adjusted during operation based on the supply air temperature relative to a supply air set-point temperature. For example, as discussed above, if the supply air temperature is below the supply air set-point temperature, the controller 120 may increase the fan speed to increase the supply air temperature. Similarly, if the supply air temperature is above the supply air set-point temperature, the controller 120 may decrease the fan speed to decrease the supply air temperature. In certain embodiments, the supply air set-point temperature may be based on a set-point temperature of the conditioned space 101, which may be set via the input device 130, or via a thermostat 132. In certain embodiments, the input device 130 or the thermostat 132 may include the temperature sensor 114 and the humidity sensor 116.

However, in certain embodiments, the evaporator coil 105 may form or accumulate ice if the evaporator coil temperature drops below approximately 42° F., which may lead to inefficiencies in the operation of the climate management system 100. Accordingly, if the evaporator coil temperature drops below approximately 42° F., the controller 120 may set or increase a minimum possible or allowable fan speed to prevent, block, reduce, or otherwise inhibit formation and accumulation of ice on the evaporator coil 105. Indeed, as mentioned above, the evaporator coil temperature may increase as the fan speed of the blower 104 increases. For example, when the evaporator coil temperature drops below approximately 42° F., the controller 120 may increase the minimum allowable fan speed of the blower 104. More particularly, the controller 120 may apply or add a minimum fan speed offset to the minimum allowable fan speed of the blower 104 at which the blower 104 may operate in order to increase the minimum allowable fan speed of the blower 104 during operation. In certain embodiments, the minimum fan speed offset applied to the minimum allowable fan speed of the blower 104 may be incrementally increased as the evaporator coil temperature falls closer to 26° F. At 26° F., the minimum fan speed offset applied to the minimum allowable fan speed may be set to approximately 100% of the total blower output, such that the blower 104 does not operate at less than 100% capacity. In other words, when the evaporator coil temperature has reached 26° F. or below, the minimum allowable fan speed may be set to 100% of the total blower output, such as a maximum possible fan speed of the blower 104. For example, the minimum fan speed of the blower 104 may be set according to equation (1):

$$MFS=(-6.25)(ECT)+262.5° \text{ F.} \quad (1)$$

where MFS is the minimum allowable fan speed, expressed as a percentage, from 1 to 100, of total blower 104 output at which the blower 104 may operate, and ECT is the evaporator coil temperature, which ranges from 42 to 26 in degrees Fahrenheit.

In this manner, the fan speed of the blower 104 may be modulated to increase or decrease based on the supply air set-point temperature, while remaining equal to or greater than the minimum allowable fan speed that is set based on the evaporator coil temperature 105. As discussed above, lower fan speeds may result in a decreased supply air temperature and increased humidity removal, which may be beneficial when providing conditioned air to the conditioned space 101. Accordingly, in certain embodiments, the fan speed may be modulated such that the fan speed is set approximately equal to the minimum allowable fan speed set by the controller 120 according to equation (1).

Moreover, in the second mode of operation, the compression of the climate management system 100 may be based on the zone temperature of the conditioned space 101, similar to the first mode of operation. Indeed, as discussed above, compression may be based on the zone temperature due to the high thermal inertia of the conditioned space 101. Particularly, the increased thermal inertia of the conditioned space 101 may result in reduced fluctuation in the zone temperature. Accordingly, due to the low fluctuation in zone temperature, the compression may be varied less, thus resulting in fewer compressor starts and correspondingly less wear on the climate management system 100. However, in certain embodiments, compression of the climate management system 100 may be based on the supply air temperature relative to the supply air set-point temperature. That is, compression may be increased as the supply air temperature rises above the supply air set-point temperature and may be decreased as the supply air temperature drops below the supply air set-point temperature.

Further, as discussed below, in some embodiments, the climate management system 100 may switch between the first and second modes of operation based in part on a humidity level of the conditioned space 101 relative to a humidity level threshold value, such as a first humidity level threshold value, which may be set via the input device 130 and/or the thermostat 132. For example, as mentioned above, in the first mode of operation, the controller 120 may adjust fan speed based on a temperature of the evaporator coil 105. The controller 120 may adjust the fan speed to maintain the evaporator coil temperature at a sufficiently low temperature to efficiently remove humidity from the supplied air and maintain the humidity level below the first threshold value. However, if the climate management system 100 is operating in the second mode of operation and the humidity level of the conditioned space 101 rises above the first humidity level threshold value, the controller 120 may switch operation of the climate management system 100 from the second mode to the first mode to more actively reduce the humidity level of the conditioned space 101, such that the humidity level falls below the first threshold value.

In certain embodiments, once the humidity level of the conditioned space 101 falls below a second humidity level threshold value, the controller 120 may switch operation of the climate management system 100 from the first mode to the second mode. In some embodiments, the second humidity level threshold value may be lower than the first humidity threshold level. In certain embodiments, however, the controller 120 may switch between the first and second modes of operation based on a manual input, which may be received via the input device 130 or the thermostat 132, for example.

Figure 6:
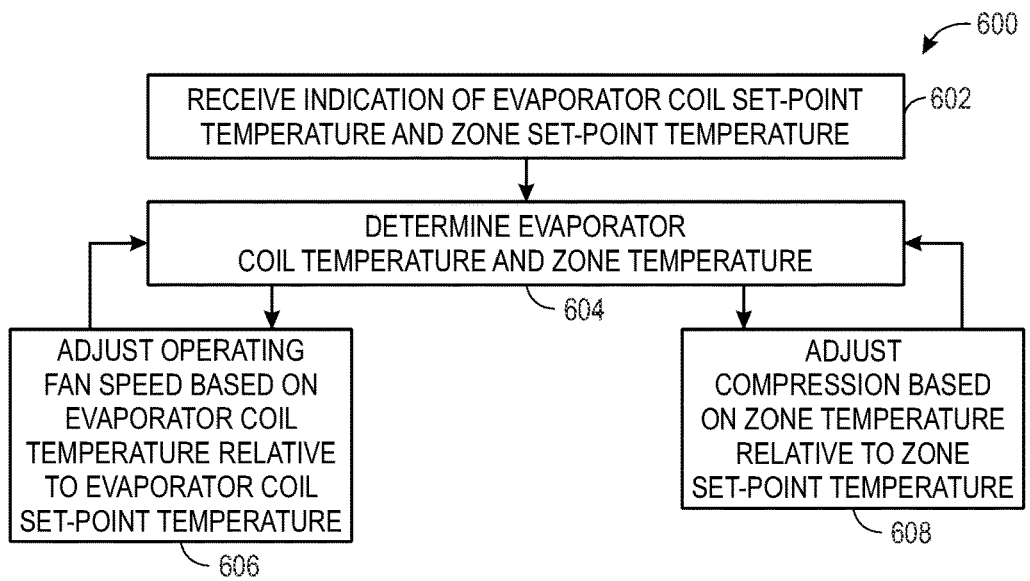
FIG. 6 is a flow chart of an embodiment of a first mode of operation of the climate management system of FIG. 5, in accordance with aspects of the present disclosure.

FIG. 6 is a flow chart illustrating an embodiment of a first mode of operation 600 of the climate management system 100. At block 602, the controller 120 may receive data indicative of an evaporator coil set-point temperature and a zone set-point temperature, which may be a set-point temperature of the conditioned space 101. As discussed herein, the evaporator coil set-point temperature and the zone set-point temperature may be set via the input device 130, which may be a thermostat, a computing device, or any device capable of receiving input and communicating the input to the controller 120.

At block 604, the controller 120 may determine the evaporator coil temperature and the zone temperature. As discussed above, to determine the evaporator coil temperature, the controller 120 may receive data indicative of the evaporator coil temperature from the temperature sensor 110 that is in contact with the evaporator coil 105. Similarly, to determine the zone temperature, the controller 120 may receive data indicative of the zone temperature from the temperature sensor 114 located in the conditioned space 101.

Once the evaporator coil temperature is determined, the controller 120 may adjust the fan speed to maintain the evaporator coil temperature at the evaporator coil set-point temperature, as indicated by block 606. Particularly, in certain embodiments, the controller 120 may utilize a control loop feedback mechanism, such as a PID controller, or a proportional-integral (PI) controller, to adjust the fan speed to achieve the evaporator coil set-point temperature. For example, as discussed above, if the evaporator coil temperature is above the set-point temperature, the controller 120 may decrease the fan speed to decrease the evaporator coil temperature. Similarly, if the evaporator coil temperature is below the set-point temperature, the controller may increase the fan speed to increase the evaporator coil temperature. As discussed above, in certain embodiments, the evaporator coil set-point temperature may be set to approximately 42° F. to inhibit the formation and accumulation of ice on the evaporator coil 105 and to efficiently remove humidity from the supply air provided to the conditioned space 101.

Further, once the zone temperature is determined, the controller 120 may adjust the compression of the climate management system 100 to achieve or maintain the zone temperature at the zone set-point temperature, as indicated by block 608. For example, as the zone temperature increases above the zone set-point temperature, the controller 120 may increase the compression, such as by increasing the number of compressors or compressor stages in operation. In this way, the controller 120 may increase the amount of cooling provided by the climate management system 100 as the difference between the zone temperature and the zone set-point temperature increases.

As illustrated, the controller 120 may repeatedly determine the evaporator temperature and repeatedly reevaluate and/or adjust the fan speed based on the evaporator coil temperature relative to the evaporator coil set-point temperature, as indicated by blocks 604 and 606. Indeed, the controller 120 may also repeatedly determine the zone temperature and repeatedly reevaluate and/or adjust the compression based on zone temperature relative to the zone set-point temperature, as indicated by blocks 604 and 608.

FIG. 7 is a flow chart illustrating an embodiment of a second mode of operation 700 of the climate management system 100. At block 702, the controller 120 may receive data indicative of an evaporator coil set-point temperature, a zone set-point temperature, and a supply air set-point temperature. As discussed herein, the evaporator coil set-point temperature, the zone set-point temperature, and the supply air set-point temperature may be set via the input device, in certain embodiments.

At block 704, the controller 120 may determine the evaporator coil temperature, the zone temperature, and the supply air temperature. Particularly, as discussed above, to determine the evaporator coil temperature, the controller 120 may receive data indicative of the evaporator coil temperature from the temperature sensor 110 that is in contact with the evaporator coil 105. Similarly, to determine the zone temperature, the controller 120 may receive data indicative of the zone temperature from the temperature sensor 114 located in the conditioned space 101. Further, to determine the supply air temperature, the controller may receive data indicative of the supply air temperature from the temperature sensor 118.

Once the evaporator coil temperature is determined, the controller 120 may determine the minimum allowable fan speed based on the evaporator coil temperature, as indicated by block 706. For example, as discussed above, as the evaporator coil temperature decreases below 42° F., the controller 120 may increase the minimum allowable fan speed pro rata. For example, the minimum allowable fan speed may be set to 0% of total blower 104 capacity when the evaporator coil temperature is at 42° F., may be set to 50% of total blower 104 capacity when the evaporator coil temperature is at 34° F., and may be set to 100% of total blower 104 capacity when the evaporator coil temperature is at 26° F. In this manner, the controller 120 may inhibit the formation and accumulation of ice on the evaporator coil 105.

Once the minimum allowable fan speed and the supply air temperature are determined, the controller 120 may adjust the fan speed to maintain the supply air temperature according the supply air set-point temperature, while maintaining the fan speed equal to or above the determined minimum allowable fan speed, as indicated by block 708. For example, as discussed above, the controller 120 may generally increase the fan speed to increase the supply air temperature and may decrease the fan speed to decrease the supply temperature.

Further, once the zone temperature is determined, at block 704, the controller 120 may adjust the compression of the climate management system 100 to achieve or maintain the zone temperature at the zone set-point temperature, as indicated by block 710. For example, as the zone temperature increases above the zone set-point temperature, the controller 120 may increase compression, such as by increasing the number of compressors or compressor stages in operation. In this way, the controller 120 may increase the amount of cooling provided to the conditioned space 101 by the climate management system 100 as the difference between the zone temperature and the zone set-point temperature increases. Similarly, the controller 120 may decrease compression as the zone temperature decreases below the zone set-point temperature. In other embodiments, the compression may be based on the supply air temperature relative to the supply air set-point temperature. That is, compression may be increased if the supply air temperature increases above the supply air set-point temperature, and compression may be decreased if the supply air temperature decreases below the supply air set-point temperature.

Moreover, as illustrated, the controller 120 may repeatedly determine the evaporator temperature and repeatedly reevaluate and/or adjust the minimum allowable fan speed based on the evaporator coil temperature, as indicated by blocks 704 and 706. The controller 120 may further repeatedly determine the supply air temperature and adjust the operating fan speed based on the minimum allowable fan speed and the supply air temperature relative to the supply air set-point temperature, as indicated by blocks 704 and 708. Indeed, the controller 120 may also repeatedly determine the zone temperature and repeatedly reevaluate and/or adjust the compression based on the zone temperature relative to the zone set-point temperature, as indicated by blocks 704 and 710.

FIG. 8 is a flow chart illustrating an embodiment of a process 800 to select, and/or switch between, the first mode of operation described with reference to FIG. 6 and the second mode of operation described with reference to FIG. 7. At block 802, the controller 120 may determine whether an input has been received to select either the first or second mode of operation. For example, an input may be received through the input device 130, as discussed above. If the input to select either the first or second mode of operation is received, the controller 120 may operate the climate management system 100 according to the selection, as indicated at block 804.

If an input for a selection of either the first or second mode of operation has not been received, the controller 120 may determine whether the humidity level of the conditioned space 101 is above a first threshold, as indicated by block 806. As discussed above, the controller 120 determines the humidity level of the conditioned space 101 based on data received from the humidity sensor 116. If the humidity level is above the first threshold, the controller 120 may operate the climate management system 100 according to the first mode of operation, as indicated by block 808. The controller 120 may then determine whether the humidity level is below a second threshold, as indicated by block 810. If the humidity level is below the second threshold, the controller may once again determine whether the humidity level is above the first threshold, as indicated by block 806. If the humidity level is below the first threshold at block 806, the controller 120 may proceed to operate the climate management system 100 in the second mode of operation, as indicated by bock 812.

In certain embodiments, the second threshold may be less than the first threshold. In this manner, the controller 120 may switch between the first and second modes of operation less often than if the first and second thresholds were even. That is, once the humidity level rises above the first threshold, and the climate management system 100 is operated in the first mode of operation, the humidity level must first decrease below the second threshold before the controller 120 may consider operating the climate management system 100 in the second mode of operation, as indicated by block 806. Otherwise, the controller 120 continues to operate in the first mode of operation, as indicated at block 808. If the humidity level is below the first threshold at block 806, the controller 120 may operate the climate management system 100 in the second mode of operation, at block 812, as discussed above. Further, in certain embodiments, the controller 120 may operate the climate management system 100 in either the first or second mode of operation based on a single humidity threshold level. That is, if the humidity level is above the single humidity threshold level, the controller 120 may operate the climate management system 100 in the first mode of operation. Correspondingly, if the humidity level is below the single humidity threshold level, the controller 120 may operate the climate management system 100 in the second mode of operation. Further, if at any time the controller 120 receives a user input regarding a selection of operating mode, the controller 120 may simply operate the climate management system 100 according the user input, as indicated at block 804.

Accordingly, the present disclosure is directed to providing systems and methods for efficiently controlling a climate management system, such as a single zone variable air volume (VAV) system. Particularly, an evaporator fan speed, such as a minimum allowable evaporator fan speed, may be determined at least in part based on a temperature of an evaporator coil. In this manner, the evaporator coil temperature may be maintained low enough to adequately cool and dehumidify the air and high enough to inhibit freezing of liquid on the coil, thereby increasing an efficiency of the climate management system. Further, compression of the climate management system 100 may be based on a zone temperature of a conditioned space, which may have a high thermal inertia. That is, the zone temperature of the conditioned space may be more resistant to change than supply air temperature, for example, thereby resulting in less cycling of the compressors and less wear on the climate management system.

While only certain features and embodiments of the present disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A non-transitory computer-readable medium, comprising instructions that, when executed by one or more processors, are configured to cause the one or more processors to:
receive, via a first sensor, data indicative of an evaporator coil temperature of a heating, ventilation, and air conditioning (HVAC) system;
receive, via a second sensor, data indicative of a humidity level in a space conditioned by the HVAC system;
operate a blower of the HVAC system at an operating fan speed to control supply of conditioned air to the space based on the evaporator coil temperature relative to an evaporator coil set-point temperature in response to a determination that the humidity level is above a threshold level; and
regulate the operating fan speed of the blower to be equal to or greater than a minimum allowable fan speed in response to a determination that the humidity level is below the threshold level.

2. The non-transitory computer-readable medium of claim 1, wherein the instructions, when executed by the one or more processors, are configured to cause the one or more processors to adjust the operating fan speed of the blower to maintain the evaporator coil temperature at the evaporator coil set-point temperature in response to the determination that the humidity level is above the threshold level.

3. The non-transitory computer-readable medium of claim 2, wherein the instructions, when executed by the one or more processors, are configured to cause the one or more processors to:
reduce the operating fan speed in response to a determination that the evaporator coil temperature is above the evaporator coil set-point temperature; and
increase the operating fan speed in response to a determination that the evaporator coil temperature is below the evaporator coil set-point temperature.

4. The non-transitory computer-readable medium of claim 1, wherein the instructions, when executed by the one or more processors, are configured to cause the one or more processors to:
receive, via a third sensor, data indicative of a temperature in the space conditioned by the HVAC system; and
stage operation of a compressor system of the HVAC system based on the temperature relative to a set-point temperature of the space.

5. The non-transitory computer-readable medium of claim 4, wherein the instructions, when executed by the one or more processors, are configured to cause the one or more processors to increase compression by the compressor system in response to determining the temperature is above the set-point temperature of the space.

6. The non-transitory computer-readable medium of claim 1, wherein the instructions, when executed by the one or more processors, are configured to cause the one or more processors to adjust the minimum allowable fan speed based on the data indicative of the evaporator coil temperature in response to the determination that the humidity level is below the threshold level.

7. The non-transitory computer-readable medium of claim 1, wherein the instructions, when executed by the one or more processors, are configured to cause the one or more processors to:
receive, via a third sensor, data indicative of a supply air temperature; and
adjust the operating fan speed of the blower and regulate the operating fan speed to be equal to or greater than the minimum allowable fan speed to maintain the supply air temperature at a supply air set-point temperature in response to the determination that the humidity level is below the threshold level.

8. A heating, ventilation, and air conditioning (HVAC) system, comprising:
an evaporator coil;
a blower configured to direct air across the evaporator coil; and
a controller configured to:
receive, via a sensor, data indicative of a humidity level within a space conditioned by the HVAC system;
operate the blower at an operating speed to maintain a temperature of the evaporator coil at a set-point temperature of the evaporator coil in response to a determination that the humidity level within the space conditioned by the HVAC system is above a threshold level; and
regulate the operating speed of the blower to be equal to or greater than a minimum allowable speed in response to a determination that the humidity level within the space conditioned by the HVAC system is below the threshold level.

9. The HVAC system of claim 8, comprising a compressor system, wherein the controller is configured to operate the compressor system based on a temperature of the space conditioned by the HVAC system relative to a set-point temperature of the space.

10. The HVAC system of claim 9, wherein the compressor system comprises a plurality of compressors, and the controller is configured to increase a quantity of the plurality of compressors of the compressor system in operation in response to determining the temperature of the space is above the set-point temperature of the space.

11. The HVAC system of claim 8, wherein the controller is configured to adjust the operating speed of the blower to maintain a temperature of a supply air flow directed into the space at a set-point temperature of the supply air flow in response to the determination that the humidity level within the space is below the threshold level.

12. The HVAC system of claim 11, wherein the controller is configured to:
increase the operating speed of the blower in response to a determination that the temperature of the supply air flow is below the set-point temperature of the supply air flow; and
decrease the operating speed of the blower in response to a determination that the temperature of the supply air flow is above the set-point temperature of the supply air flow.

13. The HVAC system of claim 8, wherein the controller is configured to adjust the minimum allowable speed based on the temperature of the evaporator coil in response to the determination that the humidity level is below the threshold level.

14. A control system for a heating, ventilation, and air conditioning (HVAC) system, comprising:
one or more processors; and
a memory comprising instructions that, when executed by the one or more processors, are configured to cause the one or more processors to:
determine, based on data received via a first sensor, an evaporator coil temperature of the HVAC system;

determine, based on data received via a second sensor, a humidity level in a space conditioned by the HVAC system;

adjust an operating speed of a blower configured to supply conditioned air to the space based on the evaporator coil temperature relative to an evaporator coil set-point temperature in response to a determination that the humidity level is above a threshold value; and regulate the operating speed of the blower to be equal to or greater than a minimum allowable speed in response to a determination that the humidity level is below the threshold value.

15. The control system of claim 14, wherein the instructions, when executed by the one or more processors, are configured to cause the one or more processors to:

operate a compressor system of the HVAC system at a first stage based on a first difference between a temperature of the space conditioned by the HVAC system and a set-point temperature of the space; and operate the compressor system at a second stage based on a second difference between the temperature of the space and the set-point temperature of the space, wherein the second stage is greater than the first stage, and the second difference is greater than the first difference.

16. The control system of claim 14, wherein the instructions, when executed by the one or more processors, are configured to cause the one or more processors to adjust the operating speed of the blower based on a temperature of the conditioned air supplied to the space relative to a set-point temperature of the conditioned air supplied to the space in response to the determination that the humidity level is below the threshold value.

17. The control system of claim 14, wherein the instructions, when executed by the one or more processors, are configured to cause the one or more processors to:

increase the minimum allowable speed in response to a determination that the evaporator coil temperature is below the evaporator coil set-point temperature; and decrease the minimum allowable speed in response to a determination that the evaporator coil temperature is above the evaporator coil set-point temperature.

18. The control system of claim 14, wherein the instructions, when executed by the one or more processors, are configured to cause the one or more processors to adjust the operating speed of the blower based on the evaporator coil temperature relative to the evaporator coil set-point temperature in response to receipt of a user input.

19. The control system of claim 14, wherein the instructions, when executed by the one or more processors, are configured to cause the one or more processors to determine the evaporator coil set-point temperature based on a user input.

* * * * *